United States Patent [19]

Okamoto et al.

[11] Patent Number: 4,661,924
[45] Date of Patent: Apr. 28, 1987

[54] MULTIPLE-PARTS-OF-SPEECH DISAMBIGUATING METHOD AND APPARATUS FOR MACHINE TRANSLATION SYSTEM

[75] Inventors: Eri Okamoto, Tokyo; Atsushi Okajima, Yokohama, both of Japan

[73] Assignee: Hitachi, Ltd., Tokyo, Japan

[21] Appl. No.: 756,670

[22] Filed: Jul. 19, 1985

[30] Foreign Application Priority Data

Jul. 31, 1984 [JP] Japan ................................ 59-162445

[51] Int. Cl.⁴ .............................................. G06F 15/38
[52] U.S. Cl. ..................................... 364/900; 364/419
[58] Field of Search ... 364/200 MS File, 900 MS File, 364/419; 434/156

[56] References Cited

U.S. PATENT DOCUMENTS 4,586,160 4/1986 Amano et al. ...................... 364/900

Primary Examiner—Raulfe B. Zache
Attorney, Agent, or Firm—Antonelli, Terry & Wands

[57] ABSTRACT

A machine translation system comprises input means for inputting a sentence written in a natural language, processor for parsing the input sentence, a word dictionary memory referred to by the processor, and a memory for storing multiple-parts-of-speech disambiguating rules in the form of a table. The parts of speech of words capable of functioning as multiple parts of speech should be in the inputted sentence are determined in consideration of an array of the parts of speech by applying the multiple-parts-of-speech disambiguating rules. Additionally, rate of appearance of each part of speech which the word of the input sentence can function as is previously calculated, and the part of speech which can not be determined by consulting the disambiguating rule table is determined in dependence on whether the rate of appearance exceeds a predetermined threshold value.

15 Claims, 12 Drawing Figures

FIG. 2

| THE | | ROSE | | LITTLE | | ROSE | | --- |
|---|---|---|---|---|---|---|---|---|
| ARTICLE | NOUN | VERB | ADJECTIVE | ADVERB | NOUN | VERB | --- | ← 41 |
| 89 | 2 | 53 | 23 | 17 | 2 | 53 | --- | ← 42 |
| | | | | | | | --- | ← 43 |
| DEFINITE ARTICLE | COMMON NOUN | PAST TENSE | MODE | NEGATION/ DEGREE | COMMON NOUN | PAST TENSE | --- | ← 44 |
| | | | | | | | --- | ← 45 |
| ARTICLE | | | | | | | --- | ← 46 |

| 31 | 32 | | | | 33 | 34 |
|---|---|---|---|---|---|---|
| ARTICLE | NOUN | VERB | ADJECTIVE | ADVERB | VERB | NOUN |
| --- | --- | --- | --- | --- | --- | --- |
| | | | | | | ADVERB |

← 3a
← 3b

| | THE | ROSE | --- |
|---|---|---|---|
| | ARTICLE | NOUN VERB | --- |
| | 89 | 2  53 | --- |
| | DEFINITE ARTICLE | COMMON NOUN  PAST TENSE | --- |
| | ARTICLE | NOUN | --- |

| | LITTLE | ROSE | --- |
|---|---|---|---|
| --- | ADJECTIVE  ADVERB | NOUN  VERB | --- |
| --- | 23  17 | 2  53 | --- |
| --- | 0.58  0.42 | 0.04  0.96 | --- |
| --- | MODE  NEGATION/DEGREE | COMMON NOUN  PAST TENSE | --- |
| --- | VERB | | --- |

| | | LITTLE | | ROSE | | |
|---|---|---|---|---|---|---|
| | | ADJECTIVE | ADVERB | NOUN | VERB | |
| | | 23 | 17 | 2 | 53 | |
| | | 0.58 | 0.42 | 0.04 | 0.96 | |
| | | MODE | NEGATION/ DEGREE | COMMON NOUN | PAST TENSE | |
| | | ADVERB | | | VERB | |

↑4   ↑41  ↑42  ↑43  ↑44  ↑45  ↑46

```
WORD     PART OF SPEECH    CORRECTION
THE      ARTICLE
LITTLE   ADVERB            ADJECTIVE
ROSE     VERB
  ·····
```
↑6a

FIG. 11

| | THE | LITTLE | | ROSE | | --- | 41 |
|---|---|---|---|---|---|---|---|
| | ARTICLE | ADJECTIVE | ADVERB | NOUN | VERB | --- | 42 |
| | 89 | 23 | 17 | 2 | 53 | --- | 43 |
| | | 0.58 | 0.42 | 0.04 | 0.96 | --- | 44 |
| | DEFINITE ARTICLE | MODE | NEGATION/ DEGREE | COMMON NOUN | PAST TENSE | --- | 45 |
| | ARTICLE | ADJECTIVE | | VERB | | --- | 46 |

FIG. 12

| | THE | LITTLE | | ROSE | | --- | 41 |
|---|---|---|---|---|---|---|---|
| | ARTICLE | ADJECTIVE | ADVERB | NOUN | VERB | --- | 42 |
| | 90 | 24 | 17 | 2 | 54 | --- | 43 |
| | | 0.58 (0.59) | 0.42 (0.41) | 0.04 | 0.96 | --- | 44 |
| | DEFINITE ARTICLE | MODE | NEGATION/ DEGREE | COMMON NOUN | PAST TENSE | --- | 45 |
| | ARTICLE | ADJECTIVE | | VERB | | --- | 46 |

MULTIPLE-PARTS-OF-SPEECH DISAMBIGUATING METHOD AND APPARATUS FOR MACHINE TRANSLATION SYSTEM

BACKGROUND OF THE INVENTION

The present invention generally relates to a multiple-parts-of-speech disambiguating system. More particularly, the invention concerns a processing method and apparatus for parsing a sentence on the basis of determination of parts of speech which words capable of functioning as multiple parts of speech should be in the sentence, by applying disambiguating rules while taking into consideration the rates or frequencies at which the parts of speech a word can function as make appearance.

For realizing a machine translation system for practical applications, it is necessary to prepare an abundance of dictionaries to be usable so that the processing for translation can be performed in the environment appoximating to the actual situation where translation is humanly made by consulting dictionaries. In the processing of sentences written in a natural language, the sentence composed of words which can function as multiple parts of speech (also referred to as multiple-parts-of-speech word) is first subjected to parsing or syntax analysis. As an example of such multiple-parts-of-speech words, there may be mentioned a word which can function selectively as a noun or a verb. The part of speech which a word should be in a given sentence has heretofore been determined by checking the parts of speech of the words preceding and succeeding to the given word and applying multiple-part-of-speech disambiguating rules prepared previously. A typical example of the processing in accordance with the multiple-parts-of-speech disambiguating rules is disclosed in Japanese Patent Unexamined publication No. 56-138586. The part-of-speech disambiguating rules are usually prepared on the basis of grammatical contraints and statistical probability. A variety of rules have heretofore been proposed. Among them, there may be mentioned the rules disclosed in Takeshi Kiyono et al's article titled "Machine Translation", Periodical of the Institute of Electronics and Communication Engineers of Japan, Vol. 46, No. 11 (November 1963).

However, when a dictionary abundant in content is used, there often arises such a situation in which the multiple-parts-of-speech words make appearance successively in a sentence, making it difficult to disambiguate deterministically the parts of speech which the words function as in the sentence with the hitherto known processing system based on the array of the parts of speech. Further, when the multiple-parts-of-speech disambiguating rules have been fixedly established, there may happen such a case where the part of speech which a word will scarcely function as in a certain sphere of literature will be selected. Under the circumstance, restriction of the range of sentences to be translated can not effectively contribute to the deterministic disambiguation of the parts of speech. At the present state of technology, it is very difficult to perform the syntax analysis and translation processing with a reasonable accuracy.

SUMMARY OF THE INVENTION

An object of the present invention is to obviate the drawbacks of the prior art and provide a part-of-speech disambiguation processing apparatus for machine translation system which apparatus is capable of determining effectively the parts of speech which the words should be in a given sentence with an improved reliability, even when the multiple-parts-of-speech words make appearance successively in the sentence, to thereby allow the accuracy of syntax analysis to be enhanced.

Another object of the present invention is to provide a part-of-speech disambiguating method for a machine translation system which method allows the parts of speech to be effectively disambiguated and the accuracy of the syntax analysis to be significantly improved.

In view of the above objects, it is proposed according to an aspect of the present invention a machine translation system which comprises input means for inputting a sentence written in a natural language, a processor for parsing the input sentence, a word dictionary memory referred to by the processor, and a memory for storing multiple-parts-of-speech disambiguating rules in the form of a table, wherein the parts of speech of words capable of functioning as multiple parts of speech should be in the inputted sentence are determined in consideration of an array of the parts of speech by applying the multiple-parts-of-speech disambiguating rules. Additionally, rate of appearance of each part of speech which the word of the input sentence can function as is previously calculated, and the part of speech which can not be determined by consulting the disambiguating rule table is determined in dependence on whether the rate of appearance exceeds a predetermined threshold value.

According to the present invention, the part-of-speech disambiguation and hence the syntax analysis or parsing of sentences written in a natural language can be accomplished with a high accuracy by virtue of such an inventive feature that the parts of speech the words should be in a given sentence are determined on the basis of the frequency at which the parts of speech makes appearance for the words while conforming to the grammatical rules of the language in which the sentence is written. Further, in case a number of sentences belonging to a same sphere of literatures written in a natural language are to be parsed, the frequencies at which the parts of speech make appearance in the sentences are updated on the basis of the result obtained from the preceding part-of-speech disambiguation processing, so that the succeeding disambiguation processing and syntax analysis of the sentences belonging to the same or similar sphere of literatures can be performed with a correspondingly increased accuracy.

BRIEF DESCRIPTION OF THE DRAWINGS

FIG. 2 is a view showing an example of a table structure for internal processing;

FIG. 3 is a view showing an example of a part-of-speech disambiguating rule table;

FIG. 4 is a view for illustrating, by way of example, application of part-of-speech disambiguating rules prepared based on array of parts of speech;

FIG. 5 is a view for illustrating an example of processing executed by consulting the internal processing table shown in FIG. 2;

FIGS. 11 and 12 are views for illustrating, respectively, correction by operator and updating of appearance frequency value, by way of example.

DESCRIPTION OF THE PREFERRED EMBODIMENTS

In the following, the invention will be described in detail in conjunction with exemplary embodiments shown in the accompanying drawings.

Figure 1:
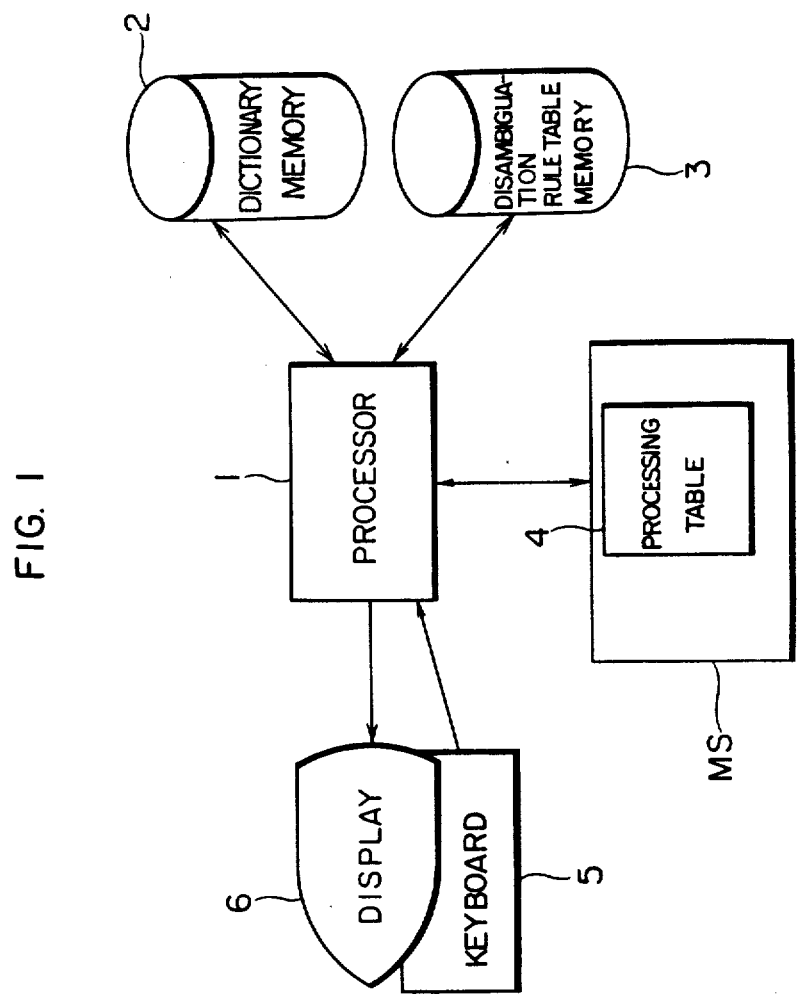
FIG. 1 is a block diagram showing a general arrangement of a machine translation system to which the part-of-speech disambiguation processing according to an embodiment of the invention is applied.

FIG. 1 shows in a block diagram a general arrangement of a machine translation processor system adapted for performing multiple-parts-of-speech disambiguating processings (i.e. processing for disambiguating the part of speech of a word which can function as multiple parts of speech) according to the teaching of the invention.

In FIG. 1, a reference numeral 1 denotes a processor for executing machine translation processings including a multiple-parts-of-speech disambiguating processing, a numeral 2 denotes an external storage equipment which is destined to be used as a memory for dictionary, 3 denotes an external storage used as a memory for storing a table of rules for disambiguation for multiple-parts-of-speech words, 4 denotes a table for internal processing incorporated in a main storage or memory (MS), 5 denotes a keyboard with which operator can input original sentences or text to be translated as well as various processing instructions, and finally the numeral 6 denotes a display device.

The dictionary memory 2 is previously loaded with contents of a dictionary through operation of the keyboard 5, while the memory 3 for storing the table of rules for disambiguating the multiple-parts-of-speech words is also previously loaded with the contents of the rule table. Alternatively, the processor 1 may read out the contents of the dictionary and the rule table from a recording medium to store them in the dictionary memory 2 and the rule table memory 3, respectively. For translation, the processor 1 segmentalizes a sentence inputted through the keyboard 5 into words and subsequently consults the dictionary memory 2 to read therefrom the parts of speech to be attached to the individual words and attribute information thereof, which are then stored in the table 4. Subsequently, the processor 1 consults the rule table memory 3 to perform the processings for multiple-parts-of-speech disambiguation by referring to the rule table 3. In the following description, it is assumed, by way of example only, that an English sentence "... THE ROSE ... LITTLE ROSE ..." is to be parsed.

FIG. 2 is a view for illustrating an exemplary structure of the internal processing table 4.

Referring to the figure, the internal processing table 4 stored in the main memory or storage MS is composed of a word storage area 41 for storing individual words of a sentence to be parsed (i.e. a sentence to undergo syntax analysis), a part-of-speech storing area 42 for storing parts of speech the words can function as, an appearance frequency storing area 43 for storing frequency of appearance of the part of speech placed in the area 42 which is to be attached to each of the words, an appearance rate storing area 44 for storing the frequency of appearance of the part of speech stored in the area 4 in terms of the appearance rate, an attribute storing area 45 for storing the attribute information of the part of speech, and a determined part-of-speech storing area 46 for storing the part of speech determined through the multiple-parts-of-speech word disambiguating processing.

Upon execution of the multiple-parts-of-speech word disambiguation processing, the processor 1 first reads out the contents of the table 3 stored in the external memory and containing the rules for disambiguating the multiple-parts-of-speech word.

FIG. 3 is a view for illustrating, by way of example only, a structure of the table 3 containing the rules for disambiguating the part of speech of the word which can function as multiple parts of speech.

The disambiguating rule table 3 is composed of an area 32 storing combinations of parts of speech which the word in concern functions as and which are to be disambiguated, an area 31 for storing the determined part of speech of a word preceding immediately to the multiple-parts-of-speech word in concern, an area 33 containing the determined part of speech of a word succeeding immediately to the multiple-parts-of-speech word in concern, and an area 34 for containing the part of speech of the word in concern as determined from the combinations placed in the area 32 on the basis of the array or storing of the parts of speech. More specifically, there are stored in the row 3a or 3b of the disambiguation rule table 3 an array or string of a multiple-parts-of-speech word in concern (i.e. the word which may function as multiple parts of speech) and the determined part of speech of the word preceding or succeeding immediately to the multiple-parts-of-speech word, wherein the part of speech of the word stored in the area 32 which is necessarily determined in view of the array or string at the row 3a or 3b is stored in the area 34. Consequently, when the array of two successive words in a sentence to be parsed coincides with the array at one of the rows 3a, 3b, ..., of the disambiguation rule table shown in FIG. 3, the part of speech of one of the two successive words which functions as multiple parts of speech can be determined by consulting the disambiguation rule table 3. In the case of the table structure illustrated in FIG. 3, the part of speech of one word which is contained at a given one of rows in the table 3 and may function as multiple parts of speech is determined on the basis of the array or string of two successive words at the given row. It should however be understood that the disambiguation rule table 3 may be configured in such a structure that a word functioning as multiple parts of speech is located at the middle of an array or string including two other neighboring words which precedes and succeeds, respectively, to the middle word and which are determined in respect to the part of speech, so that the part of speech of the middle word can be determined from the array of the three successive words.

Next, the processor 1 consults the internal processing table 4 for applying the relevant disambiguation rule.

FIG. 4 is a view showing a structure of the internal processing table for illustrating an example of application of rule for disambiguating the part of speech of a word functioning as multiple parts of speech by taking into account the array or string of the parts of speech as described above.

Referring to FIG. 4, a multiple-parts-of-speech word "ROSE" is decided to be a noun in accordance with the rule illustrated at the first row 3a in FIG. 3, because the part of speech of a word "THE" preceding immediately to the word "ROSE" is an article. The part of speech "noun" thus determined is stored in a part-of-speech storage area 46, as shown in FIG. 4.

There may arise such a situation that words whose parts of speech can not be determined remain even after execution of the disambiguating processing described above, when words capable of functioning as multiple parts of speech are arrayed in succession or unless an array of parts of speech of two successive words coincides with any of the array contained rowwise in the disambiguation rule table 3. To deal with such situation, the processor 1 makes reference to the internal processing table 4 to arithmetically determine the rate of appearance by examining the frequency at which the parts of speech a word can function as make appearance in a sentence. The determined rate of frequency is stored at the appearance rate area 44. Alternatively, the rate of appearance may be previously calculated on the basis of the frequency of appearance and stored at the area 44. The processor 1 checks sequentially the words whose parts of speech are not yet determined. When the rate of appearance of a certain part of speech exceeds a threshold level determined previously for a given word functioning as multiple parts of speech, then that part of speech is selected as the determined or disambiguated part of speech for that given word.

FIG. 5 is a view for illustrating an example of the processing through which the part of speech of a word remaining undetermined after the processing by resorting to the table shown in FIG. 4 is determined on the basis of the rate of appearance in the manner mentioned above.

More specifically, referring to FIG. 5, the threshold level is set at 0.7. Since the rate of appearance at which the multiple-parts-of-speech word "ROSE" makes appearance exceeds the threshold value of 0.7 only when the word "ROSE" is used as a verb, it is decided that the word "ROSE" is a verb. On the other hand, any one of the parts of speech which the word "LITTLE" can function as does not exceed the threshold value of 0.7, resulting in that the part of speech of this word remains undetermined at this stage.

Next, the processor 1 checks whether or not words capable of functioning as multiple parts of speech remain in the state in which the parts of speech are not determined. If so, the threshold value is decreased, and the words located adjacent to the word whose part of speech has been determined on the basis of the aforementioned rate of appearance are disambiguated with respect to their parts of speech by referring to the disambiguation rule table 3. By way of example, referring to FIG. 5, once the word "ROSE" has been attached with a verb on the basis of the rate of appearance, the part of speech of the word "LITTLE" is determined to be an adverb in accordance with the rule stored at the second row of the table shown in FIG. 3. As the result, the words "LITTLE" and "ROSE" are determined as adverb and verb, respectively. In this manner, the disambiguation of the multiple-parts-of-speech word can be realized even in case words of this sort are arrayed successively. Through the processing described so far, the parsing (or syntax analysis) of a sentence "... THE ROSE ... LITTLE ROSE ..." has been completed. If the part of speech for the word "LITTLE" can not be determined through application of the rule illustrated in FIG. 3, the part of speech whose rate of appearance is higher than the decreased threshold level (e.g. 0.5) is selected. In the case of the illustrated example, the word "LITTLE" is decided to be an adjective by referring to the value of 0.58.

As will be appreciated from the above description of the first embodiment of the invention, the parts of speech of all the words constituting a sentence are determined through repetitive execution of the disambiguating procedure based on the array of the parts of speech and the disambiguating procedure based on the rate of appearance, with the threshold value being progressively decreased, until no word remains whose part of speech is undetermined, whereupon the parsing or syntax analysis is performed on the basis of the parts of speech thus determined.

Figure 7:
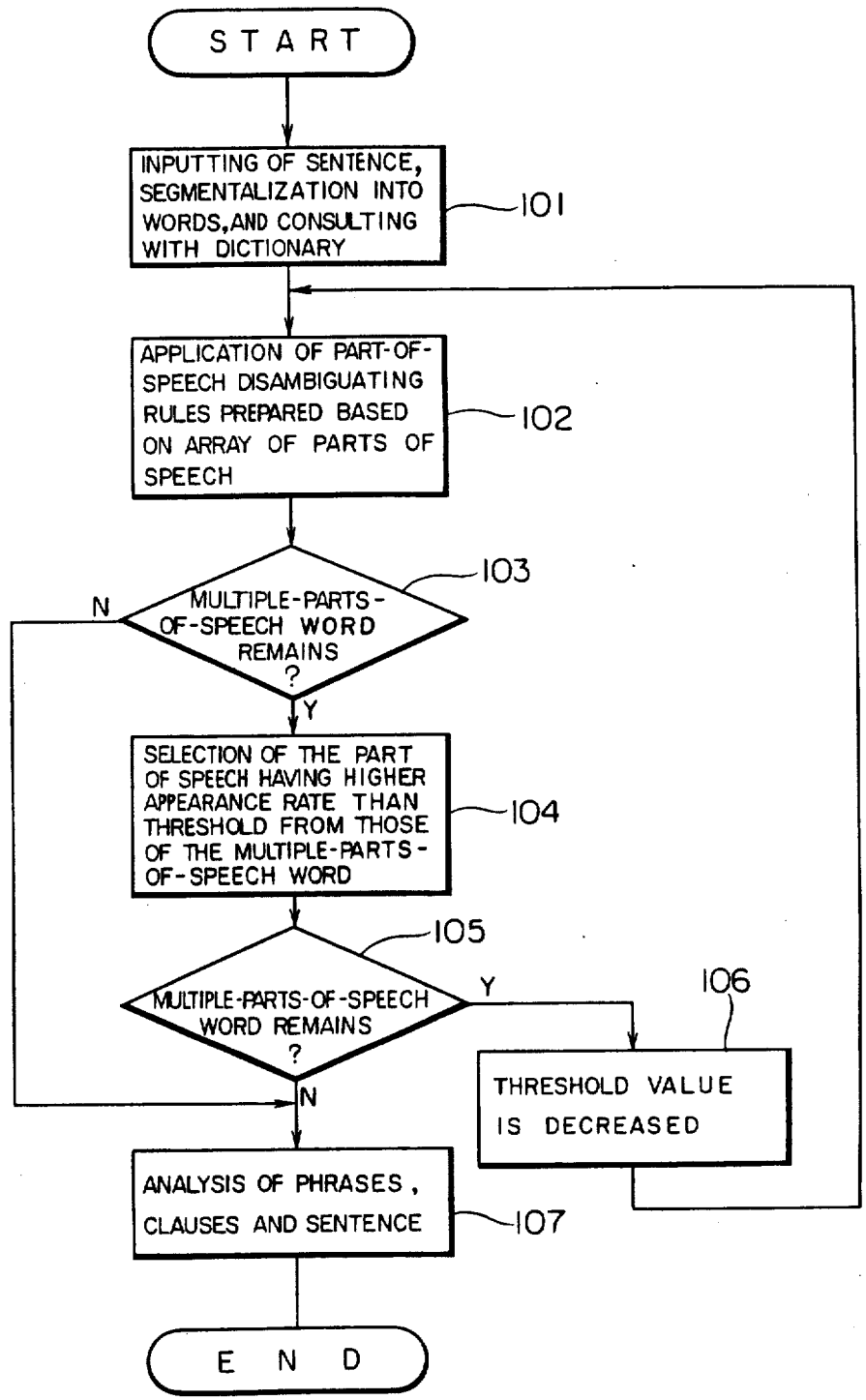
FIG. 7 is a flow chart for illustrating the part-of-speech disambiguating processing according to a first embodiment of the invention.

FIG. 7 illustrates in a flow chart the part-of-speech disambiguation processing according to the first embodiment of the invention described above.

Referring to FIG. 7 together with FIG. 1, a sentence inputted through the keyboard 5 is stored in a work memory and segmentalized into words by the processor 1. The parts of speech, the frequency of appearance of the parts of speech and attributes are retrieved from the dictionary memory 2 and stored sequentially in the internal processing table 4 for all the words (step 101). Next, the processor 1 applies the part-of-speech disambiguating rules so that the array or sequence of the parts of speech is grammatically correct (step 102).

Subsequently, the processor 1 checks whether the words which can function as multiple parts of speech remain in the state where the parts of speech are not determined yet (step 103). In case the answer is affirmative the processor 1 then consults the internal processing table 4 to examine the frequency at which the part of speech the word may function as makes appearance, to thereby determine arithmetically the rate of appearance, the result of which is stored in the area 44 allocated for the storage of the rate-of-appearance dta. When the rate of appearance of a part of speech for a given multiple-parts-of-speech word exceeds a predetermined threshold value, the processor disambiguates that part of speech to the given word (step 104). Next, it is further checked as to whether the word capable of functioning as multiple parts of speech remains still (step 105). If so (Y), the threshold value or level is reduced (step 106). The disambiguating procedure based on the array or sequence of the parts of speech is carried out by referring to the disambiguating rule table 3 for the words located neighboring the word whose part of speech has been determined through the disambiguating procedure based on the rate of appearance (step 102). After the multiple-parts-of-speech word disambiguating procedure based on the array of the parts of speech and the disambiguating procedure based on the rate of appearance are repetitively executed until the parts of speech have been determined for all the words constituting the input sentence, the syntax analysis or parsing can then be performed on the basis of the determined parts of speech.

Figure 8:
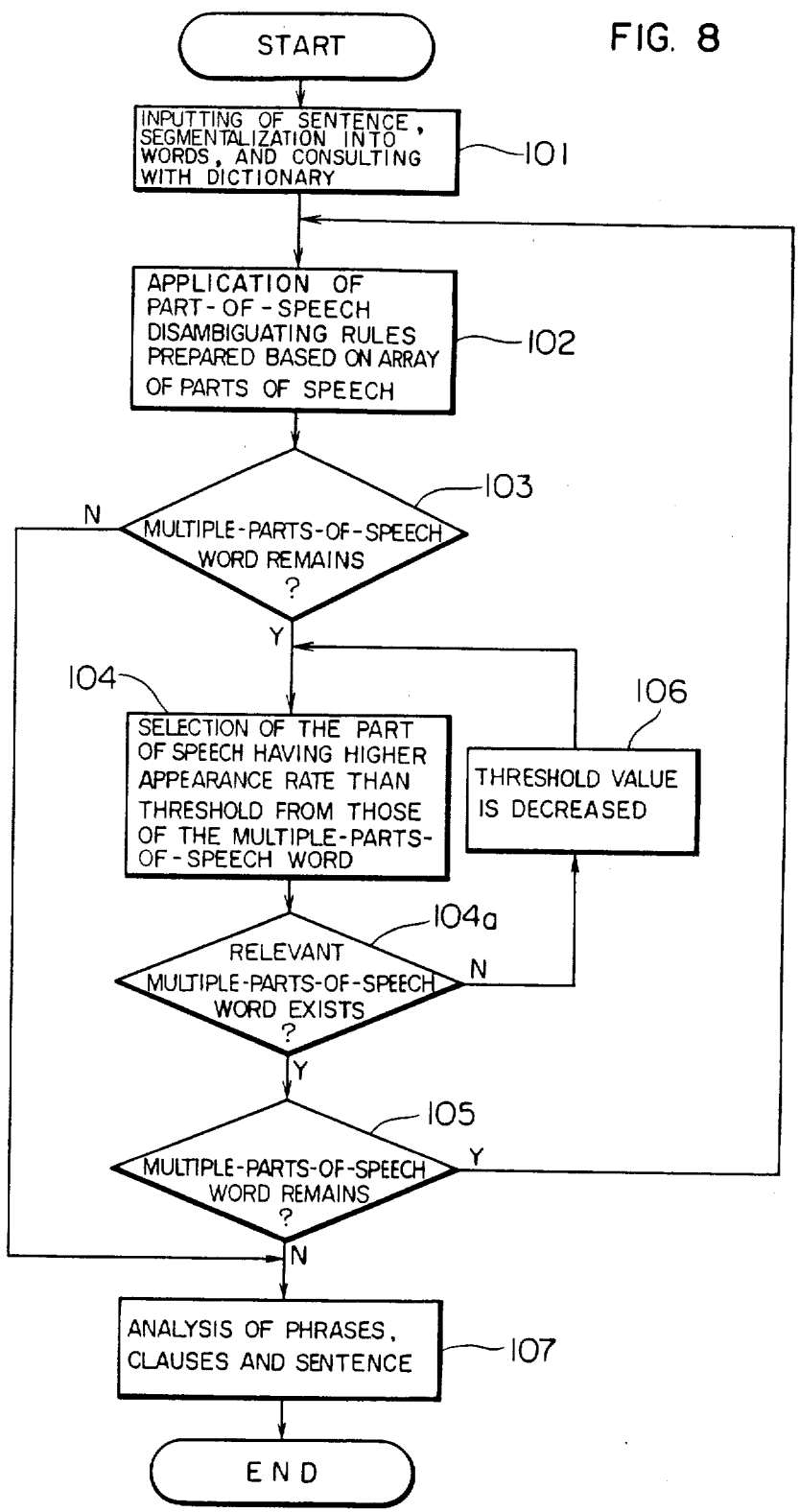
FIG. 8 is a flow chart showing a version of the processing illustrated in FIG. 7.

FIG. 8 shows in a flow chart a version of the processing shown in FIG. 7. In FIG. 8, those steps where same or similar processing or decision is performed as those shown in FIG. 7 are denoted by same reference numerals as used in FIG. 7. As will be seen from the flow chart shown in FIG. 8, the processing differs from that of FIG. 8 in that a step 104a is provided downstream of the step 104, whereby a loop is formed by the steps 104, 104a and 106. More specifically, when the rate of appearance of a certain part of speech is higher than a predetermined value, that part of speech is selected by the processor 1 at the step 104. At the step 104a, it is decided whether the part of speech selected at the step 104 is present or not. If the result of the decision is negative (N), the threshold value is further decreased at the next step 106, which is followed by the return to the step 104. In this way, the loop constituted by the steps 104, 104a and 106 is repetitively executed until the part of speech having a higher rate of appearance than the threshold valve has been selected, whereby the processing according to the procedure illustrated in FIG. 8 can be slightly expedited when compared with the procedure shown in FIG. 8.

Figure 9:
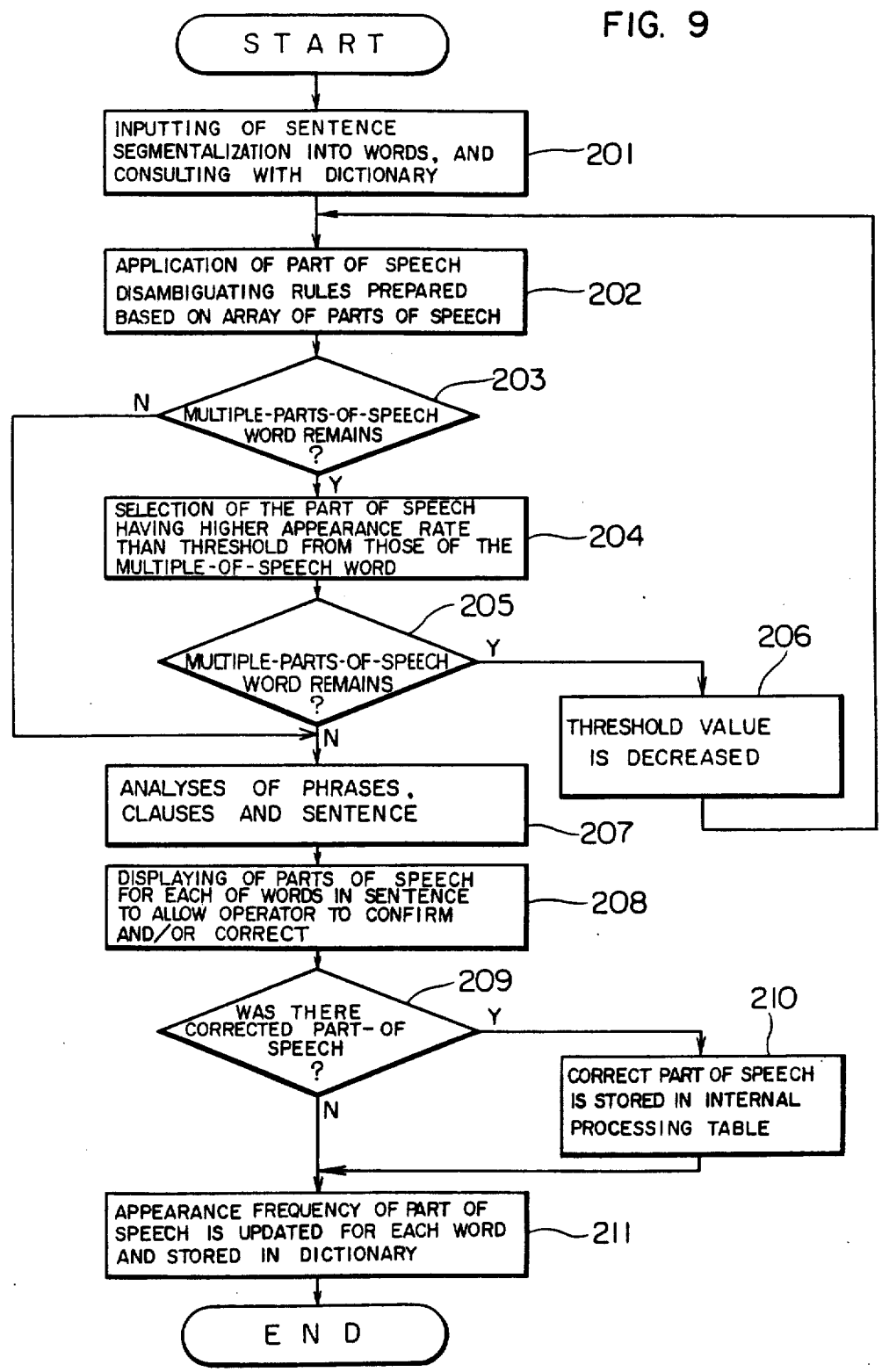
FIG. 9 is a flow chart showing the part-of-speech disambiguating processing according to a second embodiment of the invention.

FIG. 9 shows in a flow chart the part-of-speech disambiguating processing for words capable of functioning as multiple parts of speech according to a second embodiment of the invention.

The second embodiment of the invention illustrated in FIG. 9 is advantageously suited for parsing a number of sentences written about subjects belonging to a same or similar sphere by words capable of functioning as multiple parts of speech in that the result of the part-of-speech disambiguation performed on the preceding sentence or sentences is made use of for the part-of-speech disambiguation of the succeeding sentence for the purpose of improving the accuracy of the syntax analysis on parsing. Referring to FIG. 9, the utterly same processing as that shown in FIG. 7 is carried out through steps 201 to 207, i.e. the combination of the part-of-speech disambiguation procedure based on the array or sequence of the parts of speech and the part-of-speech disambiguation procedure based on the rate of appearance with reference to a threshold value. Thereafter, at steps 208 to 211, the result of the above processing is humanly confirmed and corrected, if necessary, to recognize the correct parts of speech which should make appearance. On the basis of the result of the recognition, the frequency at which a part of speech of the multiple-parts-of-speech word (i.e. word capable of functioning as multiple parts of speech) makes appearance is correctively modified so as to be reflected in the part-of-speech disambiguation of a succeeding sentence.

More particularly, referring to FIG. 9 together with FIG. 1, a sentence inputted through the keyboard 5 is segmentalized into words by the processor 1, wherein the words, the parts of speech and rate of appearance thereof and attributes are stored in the internal processing table 4 by consulting the dictionary memory 2 (step 201). For particulars of the internal processing table 4, reference be made to FIG. 4. Next, the processor 1 consults the internal processing table 4 for application of the relevant part-of-speech disambiguation rule (step 203). Concerning the part-of-speech disambiguation rules, reference should be made to FIG. 3. The result of the processing performed so far will be seen in FIG. 4. Subsequently, the processor 1 checks if there remains the multiple-parts-of-speech words (step 203). If so, the frequency of apperance of parts of speech the remaining word may function as is checked by referring to the internal processing table 4 to calculate the rates of appearance, which data is then stored at the associated area 44. When a given one of the parts of speech exhibits a higher rate of appearance than a predetermined threshold value, the given part of speech is selected (step 204). The result of the processing mentioned so far will be seen in FIG. 5 (wherein the rate of appearance is greater than the threshold value of 0.7). Thus, the word "ROSE" is decided to be a verb. Thereafter, the processor 1 again checks if there still remains the multiple-parts-of-speech word (step 205). If so, the threshold value is decreased (step 206), and the part-of-speech disambiguation processing is performed again on the basis of the array of the parts of speech for the word neighboring those words (THE ROSE, ROSE) whose parts of speech have been determined on the basis of the rate of appearance (step 202). The result of the aforementioned processing will be seen in FIG. 6 (i.e. "ROSE" is determined to be a verb with "LITTLE" being an adverb). In this way,- the parts of speech are determined for all the words contained in the inputted sentence by repeating the part-of-speech disambiguation procedure based on the array of the parts of speech and the disambiguation procedure based on the rate of appearance while decreasing the threshold value progressively, whereupon the parsing is effected on the basis of the parts of speech thus determined (step 207). It should be mentioned that the steps 201 to 207 may be modified to the steps 101 to 107 shown in FIG. 8.

Next, the processor 1 displays the determined parts of speech contained in the parsed sentence on the display 6. Operator visually observes the screen 6a of the display 6 to check whether false or irrelevant parts of speech are present. If so, the operator inputs the correct part of speech through the keyboard 5 (step 208).

Figures 6, 10:
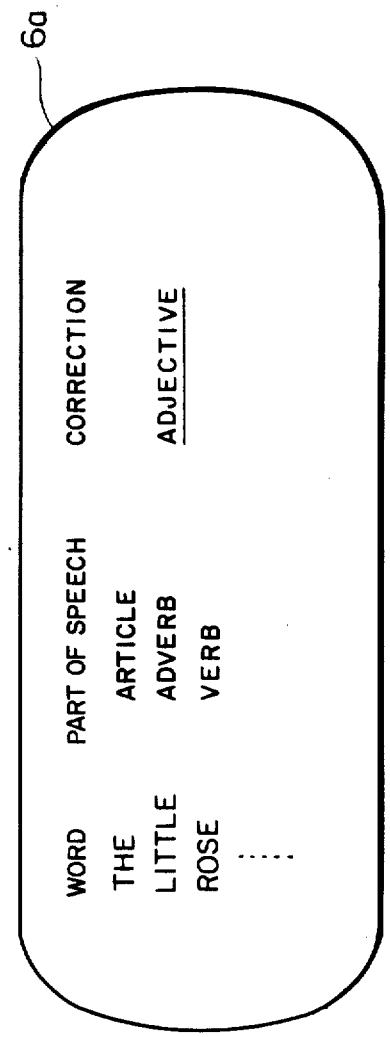
FIG. 6 is a view for illustrating, by way of example, a succeeding processing.
FIG. 10 is a schematic view of a display screen for illustrating a manner in which operator corrects the result of the part-of-speech disambiguating processing performed by the processor.

FIG. 10 shows an example of the display on the screen 6a in which the result of the part-of-speech disambiguation process is humanly corrected by the operator.

More specifically referring to FIG. 10, the operator moves a cursor on the display screen 6a to a position of the item to be corrected and inputs a correction command as well as the part of speech to replace the false one through manipulation of the keyboard 5, as the result of which the item (i.e. part of speech) to be corrected is indicated by an underline. In the case of the example illustrated in FIG. 10, the operator corrects the part of speech which the word "LITTLE" functions as, from the adverb to adjective. The processor then checks whether the part of speech resulted from the correction is present for the word under consideration (209). If so, the corrected part of speech is stored at the determined part-of-speech storing area 46 of the internal processing table 4 (step 210).

FIG. 11 is a view illustrating the contents of the internal processing table resulted from the processing up to the step (210).

Referring to FIG. 11, the area 46 of the internal processing table 4 is loaded with the adjective because the part of speech the word "LITTLE" functions as has been corrected to be an adjective.

Next, the processor 1 refers to the determined part-of-speech storing area 46 of the internal processing table 4 and stores a value corresponding to the heretofore stored frequency of appearance plus 1 (one) at the appearance frequency storing area 43. Further, the dictionary memory 4 is renewed with the updated appearance frequency by referring to the internal processing table 4 (step 211).

FIG. 12 is a view for illustrating the contents of the internal processing table obtained up to the time point the value of the appearance frequency has been updated.

In case of the illustration in FIG. 11, the appearance frequency of the word "LITTLE" functioning as an adjective is equal to 23. This value is updated to 24 (=23+1) in the case of the example shown in FIG. 12.

In this manner, every time a sentence is to be parsed, the appearance frequency of each of parts of speech for a word which can function as multiple parts of speech is updated, wherein the part-of-speech disambiguation is realized contantly on the basis of the updated appearance frequency. In this connection, it should be noted that the rate of appearance is arithmetically determined on the basis of the updated appearance frequency simultaneously with the updating thereof or in the course of the part-of-speech disambiguation processing, wherein the rate of appearance thus determined is stored at the rate-of-appearance storing area 44 of the internal processing table 4. The updated rates of appearance are shown within brackets in FIG. 12.

We claim:

1. A part-of-speech disambiguating apparatus for a machine translation system, comprising:
    input means for inputting a sentence constituted by words to be disambiguated with respect to the parts of speech which the words function as, respectively;
    a dictionary memory for storing a number of words belonging to a language used in said sentence together with respective parts of speech and appearance frequencies thereof;
    a rule table memory for storing a table containing parts-of-speech disambiguating rules for specifying the parts of speech of the words each of which can function as multiple parts of speech from an array of parts of speech of successive words in which said words whose parts of speech are to be specified are included; and
    a processor connected to said input means, said dictionary memory and said rule table memory, wherein said processor receives said sentence from said input means and determines the parts of speech of the words which are contained in said sentence and capable of functioning as multiple parts of speech, on the basis of data read out from said rule table memory, while determining the parts of speech on the basis of said appearance frequencies read out from said dictionary memory for those words whose parts of speech could not been determined on the basis of the data read out from said rule table memory.

2. A part-of-speech disambiguating apparatus according to claim 1, wherein for the undetermined word for which the part of speech can not be determined on the basis of said appearance frequency, said processor calculates rates of appearance of the parts of speech which said undetermined word can function as, compares the calculated values with a preset threshold value, and determine the part of speech corresponding to the calculated value as the part of speech for said undetermined word.

3. A part-of-speech disambiguating apparatus according to claim 2, wherein said processor again reads data from said rule table memory for determining on the basis of said data the part of speech of other word of said sentence which can function as multiple parts of speech and whose part of speech in said sentence is not yet determined, in succession to the determination of the part of speech of the word through comparison of said calculated value with said threshold value.

4. A part-of-speech disambiguating apparatus according to claim 2, wherein unless the part of speech of the word in said sentence which word can function as multiple parts of speech is determined through comparison of said calculated value with said threshold value, said processor changes said threshold value to perform again comparison of said calculated value with the changed threshold value to determine the part of speech for the word which can function as multiple parts of speech and those part of speech in said sentence is not yet determined.

5. A part-of-speech disambiguating apparatus according to claim 4, wherein in case said processor could determine the part of speech of said word through comparison of said calculated value with said changed threshold value, said processor reads out again data from said rule table memory for determining on the basis of said data the part of speech for other word which can function as multiple parts of speech and whose part of speech in said sentence is not yet determined.

6. A part-of-speech disambiguating apparatus according to claim 1, wherein said machine translation system further includes a main memory, said processor reading out from said dictionary memory the words constituting said sentence inputted through said input means as well as parts of speech which said words can function as and frequencies of appearance of said parts of speech, whereby an internal processing table is prepared in said main memory of said machine translation system, said table containing said words, said parts of speech and said frequency of appearance read out from said dictionary memory.

7. A part-of-speech disambiguating apparatus according to claim 1, wherein said rule table memory includes an array comprising rowwise a first column containing a combination of plural parts of speech and at least one second column located adjacent rowwise to said first column and containing a single part of speech, said memory further including a column designating a part of speech belonging to said combination, said part of speech being determined on the basis of said array.

8. A part-of-speech disambiguating apparatus according to claim 1, wherein said dictionary memory further stores attributes of each of said words.

9. A part-of-speech disambiguating apparatus according to claim 1, said machine translation system further including display means, wherein said processor displays on said display means the determined parts of speech which the words function as in said sentence, so that operator can alter the part of speech determined by said processor with the aid of said input means.

10. A part-of-speech disambiguating apparatus according to claim 9, wherein when the operator altered a part-of-speech determined by said processor, said processor alters the corresponding frequencies of appearance stored in said dictionary memory.

11. A method of disambiguating a part of speech which a word capable of functioning as multiple parts of speech should be, in a machine translation system comprising steps of:
    (a) preparing a dictionary memory for storing a number of words of a natural language together with parts of speech which said words can function as and frequencies of appearance of said parts of speech;
(b) preparing a rule table memory for storing a table containing part-of-speech disambiguating rules for disambiguating a part of speech of a word which is included in an array of parts of speech of successive words and which can function as multiple parts of speech;
(c) inputting a sentence written in said natural language and to be disambiguated in respect to the parts of speech which the words of said sentence should function as;
(d) determining parts of speech which the words each capable of functioning as multiple parts of speech should be in said sentence, on the basis of data read out from said rule table memory;
(e) determining parts of speech which the words capable of functioning as multiple parts of speech should be in said sentence, on the basis of said appearance frequency of the parts of speech which said words can function as and which is read from said dictionary memory, when said parts of speech could not be determined at said step (d);
(f) regaining said step (d) to execute repetitively said steps (d), (e) and (f) until the parts of speech which all the words should be in said sentence have been determined, in case the part of speech which the word capable of functioning as multiple parts of speech should be in said sentence has been determined at said step (e).

12. A part-of-speech disambiguating method according to claim 11, further comprising a step of calculating rate of appearance of each of multiple parts of speech which the word can function as in said sentence and which is not yet determined, on the basis of said appearance frequency,
wherein at said step (e), said rate of appearance thus calculated is compared with a predetermined threshold value to thereby determine the part of speech which the word capable of functioning as multiple parts of speech should be in said sentence and which has not yet been determined.

13. A part-of-speech disambiguating method according to claim 12, further comprising a step of changing said threshold value, when the part of speech of the word capable of functioning as multiple parts of speech could not be determined at said step (e).

14. A part-of-speech disambiguating method according to claim 11, further comprising a step of displaying the parts of speech for each of the words contained in said sentence on display means in succession to said step (f), and a step of altering, if necessary, the determined parts of speech through said input means while observing the display on said display means.

15. A part-of-speech disambiguating method according to claim 12, further comprising a step of the appearance frequency contained in said dictionary memory in correspondence to the part of speech altered at said part-of-speech altering step.

* * * * *